United States Patent [19]
McCaskill et al.

[11] Patent Number: 4,739,314
[45] Date of Patent: Apr. 19, 1988

[54] SPECIFYING MEASUREMENTS ON A PAGE BY POINTING

[75] Inventors: Rex A. McCaskill; John S. Wang, both of Travis County; James T. Repass, Williamson County, all of Tex.

[73] Assignee: International Business Machines Corp., Armonk, N.Y.

[21] Appl. No.: 739,369

[22] Filed: May 30, 1985

[51] Int. Cl.⁴ .............................................. G09G 3/02
[52] U.S. Cl. ................................... 340/709; 340/723; 340/731
[58] Field of Search ............... 340/723, 724, 725, 731, 340/747, 709, 726

[56] References Cited

U.S. PATENT DOCUMENTS 4,642,790 2/1987 Minshull et al. ..................... 340/726
4,661,810 4/1987 Himelstein et al. ................. 340/709
4,663,617 5/1987 Stockwell ........................... 340/726

OTHER PUBLICATIONS

"Macintosh" Kaehler, Carol et al., copyright 1983, Apple Computer, Inc.
"Lisa Draw", copyright 1983, Apple Computer Corp., pp. 138, 150, 151.
"Mac Write" copyright 1983, Apple Computer Corp., p. 79.

Primary Examiner—John W. Caldwell, Sr.
Assistant Examiner—Tyrone Queen
Attorney, Agent, or Firm—C. Lamont Whitham; Michael E. Whitham

[57] ABSTRACT

An easy-to-use technique for specifying measurements of a document to be printed uses a pointing method, such as a cursor which is moved around a display screen by means of a pointing device having a select button. The pointing cursor is moved to each desired location in a predetermined sequence, and the select button is pressed. The values of the measurements so selected are calculated based on the relative position of the pointing cursor at the time the select button is pressed.

6 Claims, 7 Drawing Sheets

```
MOVE    COPY    GET     ......   ......   ......   ......   ......

SHOW    CREATE  DESCRIBE   ......  ......  ......  ......  ......
```

This is an example of a text paragraph with
margins indented on the left and right. Let
us assume that the operator would like to          ─1
line up the margins with the edge of the
following diagram, which is embedded in the
document.

Assume there is a diagram
    of some type in this boxed      ─2
    space.

After the diagram is more text that can be
changed so that its margins also line up with
the margins of the diagram, but to do so
requires explicitly changing the margins.         ─3
This editor does not propagate changes so as
to create surprising side effects.

FIG. 1

```
MOVE     COPY    GET      .......   .......   .......   .......   .......

SHOW     CREATE  DESCRIBE         ......   ......   ......   ......   ......
                                                                              15
```

This is an example of a text paragraph with margins indented
on the left and right. Let us assume that the operator would
like to line up the margins with the edge of the following
diagram, which is embedded in the document.

> Assume there is a diagram
> of some type in this boxed
> space.

16

After the diagram is more text that can be
changed so that its margins also line up with
the margins of the diagram, but to do so
requires explicitly changing the margins.
This editor does not propagate changes so as
to create surprising side effects.

FIG. 6

SPECIFYING MEASUREMENTS ON A PAGE BY POINTING

CROSS REFERENCE TO RELATED APPLICATIONS

The invention disclosed in this application is related in subject matter to the inventions disclosed in the following patent applications which are assigned to the assignee of this application:

Ser. No. 06/645,622 filed Aug. 30, 1984, by Barbara A. Barker and Rex A. McCaskill for "Superblock Structure in a Multiple Data Editor";

Ser. No. 06/645,620 filed Aug. 30, 1984, by Barbara A. Barker and Irene H. Hernandez for "Implicit Creation of a Superblock Structure"; and Ser. No. 06/645,620 filed Aug. 30, 1984, by Barbara A. Barker, Irene H. Hernandez and Rex A. McCaskill for "Editing of a Superblock Structure".

The disclosures of the foregoing patent applications are incorporated herein by reference.

TECHNICAL FIELD

The present invention generally relates to data editors and, more particularly, to a technique for specifying the measurements on a page of a document generated using a data editor.

DESCRIPTION OF THE PRIOR ART

One of the functions supported by text editors or word processors is that of specifying measurements on the page of a document to be printed. These measurements include the left and right margins, top and bottom margins, tabs, footnote space, and any other measured location. One technique for accomplishing this is to enter the desired measurements by separate commands for each measurement. Alternatively, a menu may be displayed to the user, and the user simply fills in the blanks of the displayed menu for each of the desired measurements. In both cases, the measurements are specified in an absolute measurement of inches, millimeters or characters requiring the user to calculate the desired margins before they can be entered. The calculations involved may be complex depending on the size paper to be used in the printing operation and other factors, and at the very least, the calculations divert the user's attention from the text editor or word processor and thereby causes an inefficiency in the operation of the editor or processor. What is needed is an easy-to-use technique that allows the user to specify the measurements on the display screen without requiring any calculations.

SUMMARY OF THE INVENTION

It is therefore an object of the present invention to provide an easy-to-use technique for specifying the measurements in a document to be printed.

It is another object of the invention to provide the user of a multiple data editor with a way to specify the measurements of a document without resorting to complex calculations.

According to the invention, the user of a text editor, word processor or multiple data editor may use a pointing cursor to specify the locations of text on the display screen. The numerical value generated as a result of the pointing is based on the nearest measurement unit on a displayed scale line, whether in inches, millimeters or characters. This value is converted into the unit of measurement used in the menu specification for the page layout. This procedure is, in many cases, easier than typing in a numerical value in a displayed menu and allows the user to "eyeball" the page layout.

In its broadest application, the invention allows any parametric menu entry whose value is a measurement relative to some defined location on the page to be specified by the method of pointing. The pointing may be done with a pointing cursor on the display screen and controlled by a mouse or similar device, or the pointing may be done with the operator's finger using a touch screen display. The main point is that the operator can "eyeball" the location that is desired by using the display and pointing and the system will compute and supply the parameter that goes in the menu. During the process of "eyeballing" the location, the act of pointing can cause the underlying data of the document to scroll or pan so that the user can see the location of other items in the document and point to a location relative to the other items.

BRIEF DESCRIPTION OF THE DRAWINGS

The foregoing and other objects, aspects and advantages of the invention will be better understood from the following detailed description of the invention with reference to the drawings, in which:

FIG. 1 is an illustration of a screen displaying a document that has a paragraph followed by a space with a diagram followed by another paragraph;

FIG. 6 illustrates the result of reformatting the paragraph after the margins have been specified to line up with the diagram space.

DETAILED DESCRIPTION OF A PREFERRED EMBODIMENT OF THE INVENTION

Figure 2:
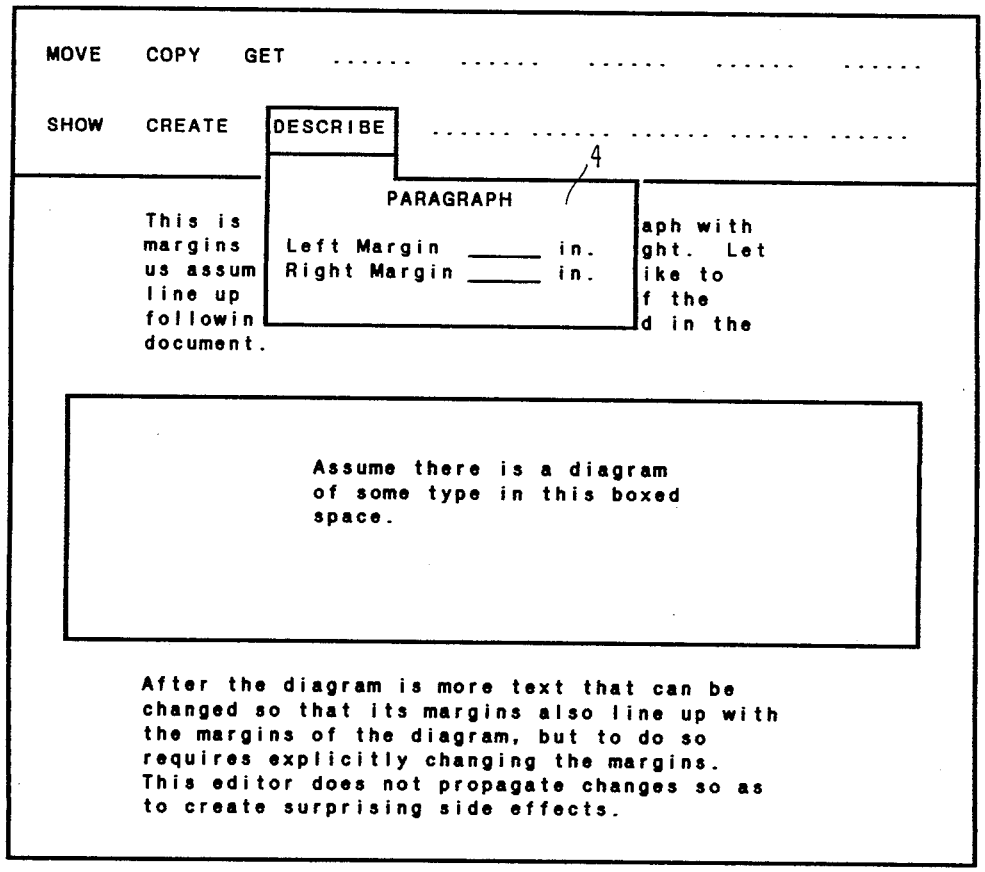
FIG. 2 shows the result of selecting the DESCRIBE command on the screen of FIG. 1 and illustrates a pop-down menu for specifying margins.

The invention is described by way of an example, specifically that of specifying the margins of a document by pointing. In addition, in this example, it is assumed that a pointing cursor displayed on the screen which displays at least a portion of a page of the document is used to do the pointing. Such a cursor is conveniently controlled by a mouse or similar device such as a track ball or joy stick but may be controlled by keys on a keyboard. Those skilled in the art will understand, however, that the invention is not limited to the specifying of margins nor the use of a pointing cursor. According to its broadest aspect, the invention contemplates the specification of any measurement on a page of a document by pointing. Moreover, the method of pointing is not a limiting factor in the practice of the invention and includes such methods as pointing by the operator with his or her finger, a pencil or other implement to a point on the screen or a tablet.

A pointing cursor, as assumed herein for the illustrative example, is a cursor in the form of an arrow or other appropriate shape which is freely movable around a display screen. The means for moving the pointing cursor may be a pointing device such as a mouse or a digitizing tablet. Both of these devices operate as relative position devices wherein as the mouse, for example, is moved about on a flat surface, the displayed pointing cursor moves in the direction the mouse is moved. Typically, the mouse is picked up from the flat surface and then moved along the flat surface several times in the same general location in order to make the displayed pointing cursor move greater distances on the display screen. If the displayed pointing cursor is moved out of the displayed area, the display is made to scroll so that the pointing cursor always remains within the visual displayed area. A similar operation can be achieved with the digitizing tablet except that a hand-held cursor, not to be confused with the displayed pointing cursor, is moved over the surface of the digitizing tablet in order to effect movement of the displayed pointing cursor. The mouse and the hand-held cursor are generally provided with two or more buttons which may be easily pressed by the index finger, for example, of the user's hand which is holding the device. One of these buttons is typically the select button which, when pressed, indicates that the displayed object nearest the displayed pointing cursor is to be selected for some operation. Pointing cursors are used not only to select some object on the display, but also to select an icon representing a command in the application program.

In the subject invention, the user may, for example, use the pointing cursor to select an icon for page layout to cause a popdown panel to appear on the screen. The pointing cursor is then used to select margins from the popdown panel. The pointing cursor is then moved to each desired margin in a predetermined sequence according to prompts displayed on the screen, and the user selects the positions of the margins by simply pressing the select button on the pointing device. The actual margin values are automatically calculated by the application program.

In a specific, illustrative example of the practice of the invention, margins are specified as a measurement from the left edge of the paper. In some systems, the left margin is specified by inputting the distance from the left paper edge, and the right margin is specified by inputting the distance from the right paper edge. In this case, the right margin specification can be derived from a measurement from the left paper edge by subtracting the measurement relative to the left paper edge from the width of the paper. Since a simple calculation such as this can be done, it is assumed for the purpose of this description that all measurements are made from the left edge of the paper. The description that follows will be for determining the value of a menu selection that is to be a measurement from the left edge of the paper. In order to apply this to the case of specifying margins, it is assumed that a menu has been created for which there are selections for left and right margin that are to be measured from the left edge of the paper. Of course, the location of tab settings, temporary margins and any other type of specification based on the distance from the left paper edge can also be done simply by creating a menu with this type of parameter for that specification.

FIG. 1 is an example of a document that has a paragraph 1 followed by a space 2 with a diagram in it followed by another paragraph 3. It is assumed that menu processing procedures exist that allow the user to request the presentation of a menu and that procedures exist for the processing of the menu. It is further assumed that these processing procedures are designed to identify the type of menu item selected and will call the appropriate procedure to supply a value for the selected item. It is also assumed that there are procedures that are available that can be called in order to update the displayed value for the item selected in the menu. A window management system is also assumed to be in place that allows scrolling of the document data while the menu is being displayed. Procedures are assumed for scrolling the document data in all directions. Those skilled in the art will recognize that all of these assumptions are reasonable in view of the fact that there are many application programs that are commercially available which embody some or all of these features. For purposes of simplicity, these background procedures will not be further described in the description of the specific, illustrative example of the invention.

Figure 3:
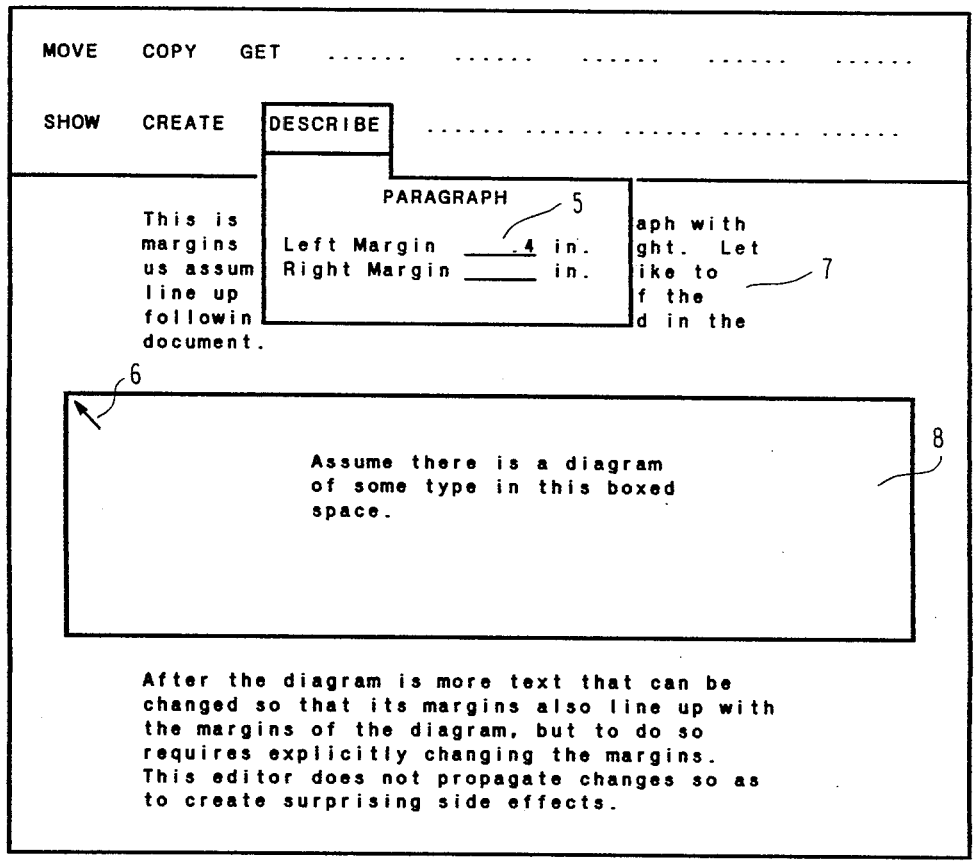
FIG. 3 shows the screen of FIG. 2 and illustrates how the menu item for the left margin is generated by using a pointing cursor.

In the case of the example shown in FIG. 1, the operator first places the pointing cursor on the command DESCRIBE and presses the select button. The result of this action is shown in FIG. 2 which shows the popdown menu 4 that is used to set the left and right margins of a selected paragraph. It should be noted that more options may be available in a menu such as this and that some default values may be supplied in some of the fields. This figure only shows the left and right margin attributes of the paragraph to illustrate the principles of the invention. FIG. 3 illustrates how the menu item for the left margin 5 is generated by using the pointing cursor 6 to point to a location on the page. In this case, the paragraph 7 is to have its left margin line up with the left edge of the space 8 in which the diagram appears. Note that if the space 8 had been off of the display screen, document scrolling could have been triggered so that it appears on the screen.

Figure 4:
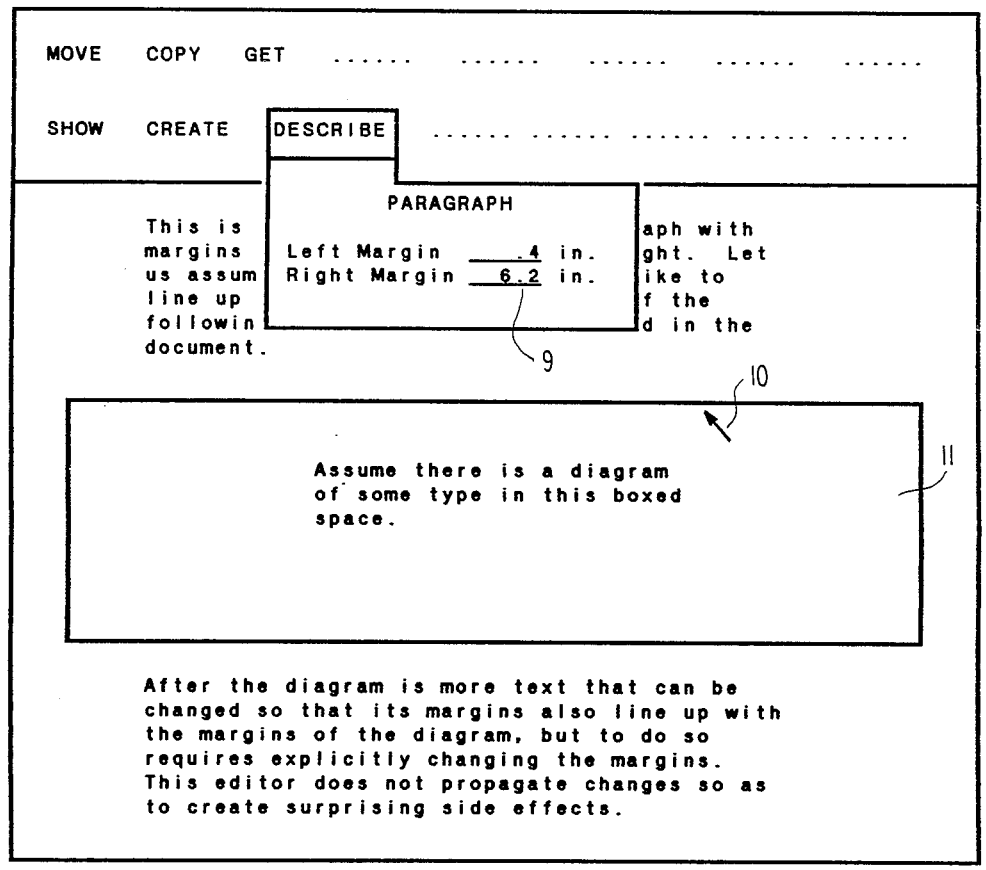
FIG. 4 shows the screen of FIG. 2 and illustrates the processing that occurs as the right margin parameter is specified.
Figure 5:
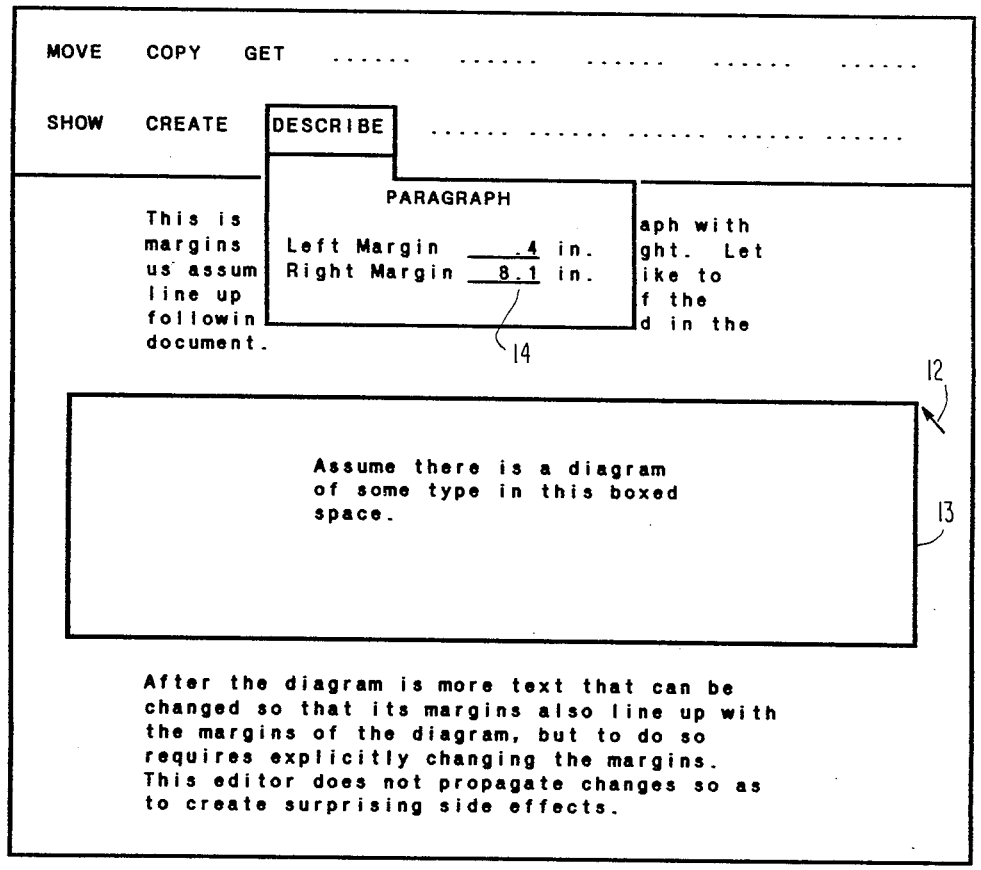
FIG. 5 shows the screen of FIG. 2 with the pointing cursor at the right edge of the diagram space and the value of the right margin parameter indicating the desired measurement.

Having specified the left margin, FIG. 4 shows the processing that occurs as the right margin parameter 9 is being specified. The pointing cursor 10 is being moved toward the right edge of the diagram space 11, and as it moves, the value for the right margin parameter 9 is constantly updated to show the current value that would be specified if the pointing cursor 10 were stopped and that location selected. FIG. 5 shows the pointing cursor 12 at the right edge of the diagram space 13 and the value in the right margin parameter 14 indicating the desired measurement. At this point, the operator indicates to the system to commit the value to the menu by pushing a button on the mouse or keyboard or by some other means. After that action, the value in the right margin parameter 14 is no longer updated as the pointing cursor moves. FIG. 6 shows the result of reformatting the paragaph 15 after the margins have been specified to line up with the diagram space 16.

The following is a Program Design Language (PDL) description of the processing to be performed for a type of menu selection such as a margin specification that is to be a measurement from the left edge of the paper. Source and object code can be readily derived from the PDL listing by a programmer skilled in the art. This procedure is called from the menu processing proceducers when this type of menu item is selected. It is assumed that a parameter is available that specifies that distance from the left edge of the paper to the portion of data displayed at the left edge of the screen. This parameter will be called LEFT_SCREEN_EDGE_DISTANCE.

```
IF selection is to be edited from keyboard THEN
   Call normal keyboard edit for the selection.
ELSE (selection is to be determined by pointing)
   UNTIL commit signal received DO
      Query the pointer location on the screen.
      IF the pointer is at a screen edge THEN
         Call the appropriate scrolling procedure to
            scroll the document data.
         Recalculate LEFT_SCREEN_EDGE_DISTANCE based
            on the display after scrolling has
            occured.
         Update the pointer location on the screen if
            necessary.
      ENDIF
      Compute location relative to left paper edge
         by adding the LEFT_SCREEN_EDGE_DISTANCE and
         the distance that the pointer is from the
         left edge of the screen.
      Format result for display in the panel.
      Call panel display to update the selected
         value.
   ENDDO UNTIL
```

Figure 7:
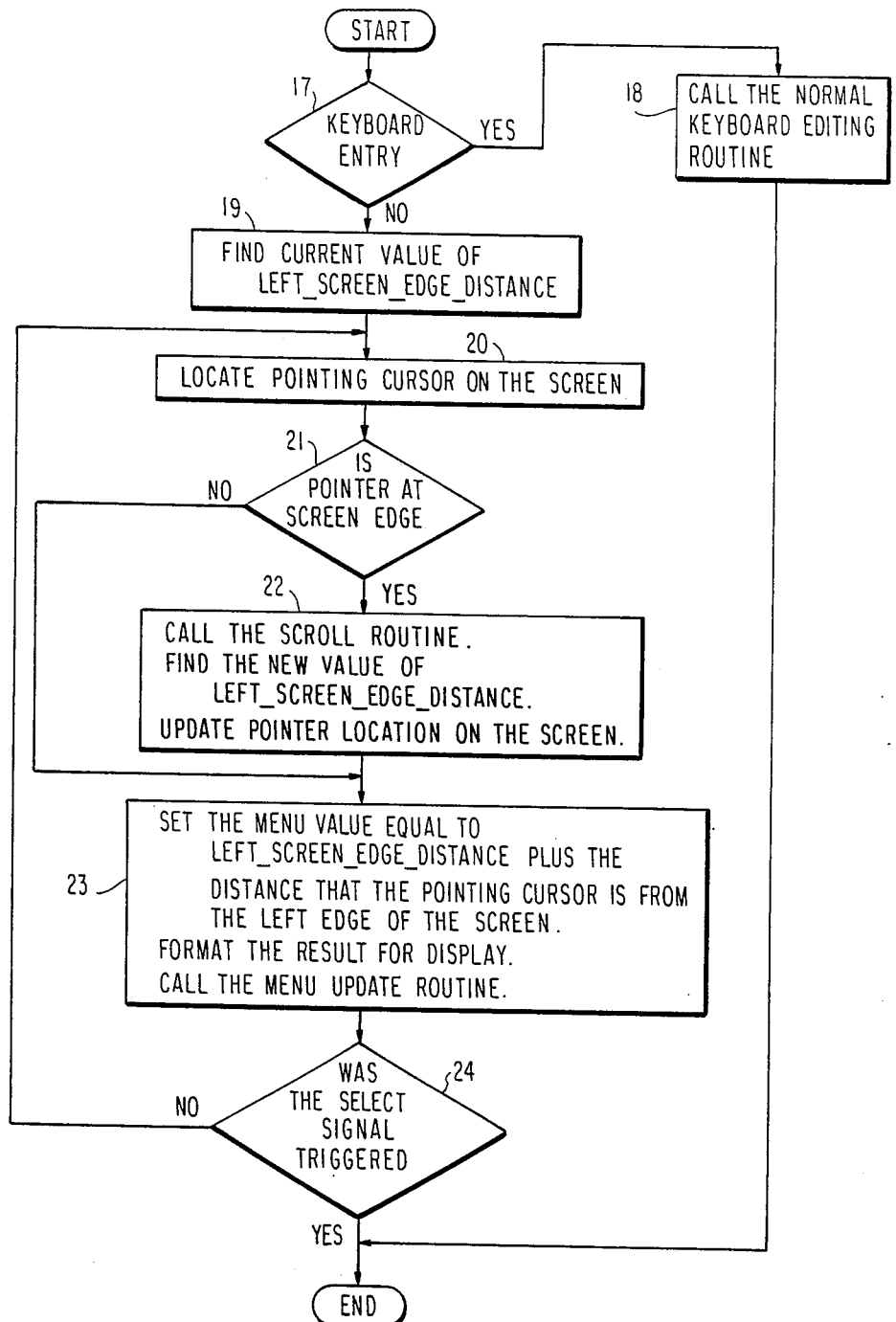
FIG. 7 is a flow chart showing the process for specifying margins by pointing as one specific example of the invention.

FIG. 7 is a flow chart showing the process of the PDL code above. When this procedure begins, the menu parameter has been selected, and the value is to be specified. From some explicit or implied action of the operator, as for example the operator begins typing on the keyboard or moving a mouse, the system determines if the value will be specified by keyboard entry or by pointing, as indicated in block 17. If keyboard entry is used, then a procedure is called to do the processing as indicated in block 18. If the value is to be specified by pointing, the Left_Screen_Edge Distance is determined in block 19. This value indicates the distance from the left edge of the paper to the data displayed at the left most edge of this screen. The location of the pointing cursor is determined as indicated in block 20. This value when added to the Left_Screen_Edge Distance will give the relative distance from the left paper edge to which the cursor points. If the pointing cursor moves to the edge of the screen, in any direction, then a scrolling routine is used to reposition data on the display and the Left_Screen_Edge_Distance and pointer are updated, as indicated in blocks 21 and 22. The distance that the pointing cursor points to relative to the left edge is computed, and the menu is updated as indicated in block 23. If the operator indicates that the location is selected, then processing is complete and the routine ends, as shown in block 24. Otherwise, the processing is repeated, beginning at the point that the cursor location is identified by looping back to block 20.

While the invention has been described in terms of but one specific example, that being for the specification of the left and right margins of a document with reference to the left edge of the paper, those skilled in the art will recognize that the invention can be practiced to specify any dimension of a document relative to any reference by means of a pointing cursor. The invention therefore provides a particularly easy-to-use technique for user specification of margins in a document to be printed.

We claim:

1. A method of specifying measurements of objects relative to page boundaries in a document to be printed comprising the steps of:
   displaying at least a portion of a page of said document on a display screen, said step of displaying producing a page display field showing only those objects which to be printed and in a relative size and spacing corresponding to their relative size and spacing as those objects would be printed on the page in said document;
   pointing to a desired location in said page display field to define a measurement of an object on the page, said pointing step being performed by a pointing cursor; and
   calculating the location relative to said page boundaries of said document pointed to in said pointing step, said location being used to format printing of said page.

2. The method of specifying measurements of objects as recited in claim 1 further comprising the step of displaying the calculated location on said display screen at a location out of said page display field.

3. The method of specifying measurements of objects as recited in claim 2 wherein the step of calculating is performed in real time as said pointing cursor is moved across said page display field and said step of displaying produces a display of a real time calculated position of said pointing cursor as a current measurement of an object.

4. The method of specifying measurement of objects as recited in claim 1 wherein the object is a text object and the location pointed to is a margin of the text object.

5. The method fo specifying measurements of objects as recited in claim 2 further including the steps of:
   responding to the selection of an input command to display a pop down window overlapping said page display field on said display screen, said pop down window having a menu including margins for said page;
   responding to a selection of one of said margins from said pop down window by performing said step of displaying the calculated value of the margin at a predefined location in said pop down window.

6. The method of specifying measurements of objects as recited in claim 1 further comprising the steps of:
   detecting if said pointing cursor is at an edge of said page display field; and
   scrolling said page with said page display field when said pointing cursor is at an edge of said page display field.

* * * * *

UNITED STATES PATENT AND TRADEMARK OFFICE
CERTIFICATE OF CORRECTION

PATENT NO.  :  4,739,314

DATED       :  April 19, 1988

INVENTOR(S) :  R. A. McCaskill et al

It is certified that error appears in the above-identified patent and that said Letters Patent is hereby corrected as shown below:

Col. 6, line 13, before "to" insert --are--.

Col. 6, line 40, delete "fo" and insert --of--.

Col. 6, line 55, delete "with" and insert --within--.

Signed and Sealed this

Twentieth Day of August, 1991

*Attest:*

HARRY F. MANBECK, JR.

*Attesting Officer*      Commissioner of Patents and Trademarks